US011560323B2

(12) United States Patent
Wilson et al.

(10) Patent No.: US 11,560,323 B2
(45) Date of Patent: *Jan. 24, 2023

(54) COMPOSITIONS OF DRY ACID POLYMERS AND USES THEREOF

(71) Applicant: KEMIRA OYJ, Helsinki (FI)

(72) Inventors: Duane C. Wilson, Marietta, GA (US); Thomas Fenderson, Decatur, GA (US); Igal Maasen, Acworth, GA (US); Sukhjit Aujla, The Woodlands, TX (US)

(73) Assignee: KEMIRA OYJ, Helsinki (FI)

( * ) Notice: Subject to any disclaimer, the term of this patent is extended or adjusted under 35 U.S.C. 154(b) by 1 day.

This patent is subject to a terminal disclaimer.

(21) Appl. No.: 17/230,494

(22) Filed: Apr. 14, 2021

(65) Prior Publication Data

US 2021/0300803 A1    Sep. 30, 2021

Related U.S. Application Data

(62) Division of application No. 15/728,786, filed on Oct. 10, 2017, now Pat. No. 11,001,513.
(Continued)

(51) Int. Cl.
*C02F 1/56* (2006.01)
*C02F 11/147* (2019.01)
(Continued)

(52) U.S. Cl.
CPC .............. *C02F 1/56* (2013.01); *C02F 11/14* (2013.01); *C02F 11/147* (2019.01);
(Continued)

(58) Field of Classification Search
CPC ................ C08F 220/56; C08L 33/26; C08L 2205/025; C02F 1/56; C02F 11/14; C02F 11/147; C02F 2103/10
See application file for complete search history.

(56) References Cited

U.S. PATENT DOCUMENTS 3,487,003 A * 12/1969 Baillie et al. ............. C02F 1/66
210/195.1
3,723,310 A  3/1973 Lang et al.
(Continued)

FOREIGN PATENT DOCUMENTS

| CA | 2897657 | 7/2014 |
| CA | 2930003 | 6/2015 |
| RU | 2453504 C2 * | 6/2012 |

OTHER PUBLICATIONS

Sepulveda et al. "Hot water extraction of bitumen from Utah tar sands." Am. Chem. Soc., Div. Fuel Chem., Prepr. (United States). Jan. 1, 1976;21(6).

*Primary Examiner* — James C Goloboy
(74) *Attorney, Agent, or Firm* — Robin L. Teskin; Baker, Donelson, Bearman, Caldwell & Berkowitz PC

(57) ABSTRACT

The present embodiments generally relate to the use of one or more polymers, e.g., one or more dry acid polymers and/or one or more dry acid polymers with salt, as flocculants, generally for treating tailings, e.g., oil sands tailings, in need of solid-liquid separation, e.g., in order to efficiently recycle water and/or to reduce the volume of tailings which may be transferred to a tailings pond and/or a dedicated disposal area.

11 Claims, 3 Drawing Sheets

Related U.S. Application Data

(60) Provisional application No. 62/405,650, filed on Oct. 7, 2016.

(51) Int. Cl.
*C02F 11/14* (2019.01)
*C08F 220/56* (2006.01)
*C08L 33/26* (2006.01)
*C02F 103/10* (2006.01)

(52) U.S. Cl.
CPC ............ *C08F 220/56* (2013.01); *C08L 33/26* (2013.01); *C02F 2103/10* (2013.01); *C08L 2205/025* (2013.01)

(56) References Cited

U.S. PATENT DOCUMENTS

| | | | | |
|---|---|---|---|---|
| 5,668,252 | A | * | 9/1997 | Yokoi ........................ C08F 6/12 528/503 |
| 11,001,513 | B2 | * | 5/2021 | Wilson .................. C08F 220/56 |

* cited by examiner

COMPOSITIONS OF DRY ACID POLYMERS AND USES THEREOF

RELATED APPLICATIONS

This application is a divisional of U.S. application Ser. No. 15/728,786, filed Oct. 10, 2017, which claims priority to U.S. Provisional Application No. 62/405,650, filed Oct. 7, 2016, each of which is hereby incorporated by reference in its entirety.

FIELD OF THE ART

The present disclosure generally relates to compositions and uses thereof, e.g., as flocculants, in the processing of tailings, e.g., oil sands tailings.

BACKGROUND

Bituminous sands, also referred to as oil sands, are a type of petroleum deposit. Oil sands typically contain naturally occurring mixtures of sand, clay, water, and a dense, extremely viscous form of petroleum technically referred to as bitumen (or colloquially "tar" due to their similar appearance, odor, and color). Oil sands may be found in large quantities in many countries throughout the world, most abundantly so in Canada and Venezuela. Oil sand deposits in northern Alberta in Canada (Athabasca oil sands) are thought to contain approximately 1.6 trillion barrels of bitumen, and production from oil sands mining operations is expected to reach 1.5 million barrels of bitumen per day by 2020.

Oil sands reserves are an important part of the world's oil reserves, particularly as higher oil prices and new technology enable oil sands reserves to be profitably extracted and upgraded to usable products. Oil sands are often referred to as unconventional oil or crude bitumen, in order to distinguish the bitumen extracted from oil sands from the free-flowing hydrocarbon mixtures known as crude oil traditionally produced from oil wells.

Conventional crude oil may be extracted from the ground by drilling oil wells into a petroleum reservoir and allowing oil to flow into them under natural reservoir pressure, although artificial lift and techniques such as water flooding and gas injection may be required to maintain production as reservoir pressure drops toward the end of a field's life. Since extra-heavy oil and bitumen flow very slowly, if at all, towards producing wells under normal reservoir conditions, the sands may be extracted by strip mining or the oil made to flow into wells by in situ techniques that reduce the viscosity, such as by injecting steam, solvents, and/or hot air into the sands. These processes may use more water and may require larger amounts of energy than conventional oil extraction, although many conventional oil fields also typically require large amounts of water and energy to achieve good rates of production.

Water-based oil sand extraction processes generally include ore preparation, extraction, and tailings treatment stages wherein a large volume of solids-laden aqueous tailings may generally be produced. The original process for extraction of bitumen from oil sands was developed by Dr. Karl Clark while working with the Alberta Research Council in the 1920s. Today, producers using surface mining processes typically use a variation of the Clark Hot Water Extraction ("CHWE") process. In this process, the ores are usually mined using open-pit mining techniques. The mined ore may then be crushed for size reduction in relatively large tumblers or conditioning drums. Hot water at 40-80° C. may be added to the ore, thereby forming a slurry. The formed slurry may be conditioned and transported, for example using a piping system called hydrotransport line, to extraction units, for example to a primary separation vessel ("PSV"), in which a flotation process may be used to recover bitumen as bitumen froth. The hydrotransport line may be configured to condition the oil sands stream while moving it to the extraction unit. The water used for hydrotransport is generally cooler (but still heated) than that in the tumblers or conditioning drums.

The displacement and liberation of bitumen from the sands may be achieved by wetting the surface of the sand grains with an aqueous solution containing a caustic wetting agent, such as sodium hydroxide. The resulting strong surface hydration forces operative at the surface of the sand particles generally give rise to the displacement of the bitumen by the aqueous phase. For example, sodium hydroxide may be added to the slurry to maintain a basic pH, e.g., in the range of 8.0 to 10. This addition generally has the effect of dispersing fines (particle size less than 44 μm) and clays from the oil sands and reducing the viscosity of the slurry, thereby reducing the particle size of the minerals in the oil sands.

Once the bitumen has been displaced and the sand grains are free, the components may be separated. Gravity can cause sand and rock from the slurry to settle to a bottom layer. A portion of the bitumen can float to the top based on the natural hydrophobicity exhibited by the free bituminous droplets at moderate alkaline pH values, and may be removed as bitumen froth. An intermediate portion, often referred to as middlings, is usually relatively viscous and typically contains dispersed clay particles and some trapped bitumen which typically is not able to rise due to the viscosity. The middlings may then be exposed to froth flotation techniques to recover additional bitumen. (Hot water extraction of bitumen from Utah tar sands, Sepulveda et al. S. B. Radding, ed., Symposium on Oil Shale, Tar Sand, and Related Material—Production and Utilization of Synfuels: Preprints of Papers Presented at San Francisco, Calif., Aug. 29-Sep. 3, 1976; vol. 21, no. 6, pp. 110-122 (1976)).

The recovered bitumen froth generally may comprise 60% bitumen, 30% water, and 10% solids (sand and clay fines) by weight. The recovered bitumen froth may be cleaned to reject the contained solids and water to meet the requirement of downstream upgrading processes. Depending on the bitumen content in the ore, between 70 and 100% of the bitumen may be recovered using modern hot water extraction techniques from high grade ores.

Hydrophilic and biwetted ultrafine solids, mainly clays and other charged silicates and metal oxides, tend to form stable colloids in water and to exhibit a very slow settling and dewatering behavior, resulting in tailing ponds that may take several years to manage.

In tailings ponds, the process water, unrecovered hydrocarbons and minerals generally settle naturally to form different strata. The upper stratum is usually primarily water that may be recycled as process water to the extraction process. The lower stratum generally contains settled residual hydrocarbon and minerals which are predominately fines. This lower stratum may often be referred to as "mature fine tailings" ("MFT"). Mature fine tailings tend to have slow consolidation.

The composition of mature fine tailings tends to be highly variable. Near the top of the stratum the mineral content may be about 10% by weight and over time may consolidate and comprise up to 50% by weight of the materials contained at the bottom of the stratum. Overall, mature fine tailings may have an average mineral content of about 30% by weight. While fines may generally be the dominant particle size fraction in the mineral content, the sand content may be 15% by weight of the solids and the clay content may be up to 75% by weight of the solids, reflecting the oil sand ore and extraction process. Additional variation may result from the residual hydrocarbon which may be dispersed in the mineral or may segregate into mat layers of hydrocarbon. The mature fine tailings in a pond may not only contain a wide variation of compositions distributed from top to bottom of the pond, but also may contain pockets of different compositions at random locations throughout the pond. Additionally, mature fine tailings generally behave as a fluid-like colloidal material.

The slow settling of fine (<45 μm) and ultrafine clays (<0.3 μm) as well as the large demand of water during oil sand extraction process have promoted research and development of new technologies during the last 20 years to modify the water release and to improve settling characteristics of tailings streams. These include process additives such as variations in pH and salinity as well as the addition of chemical substances. Currently, two technologies commonly used in the oil sands industry are the consolidated tailings ("CT") process and the paste technology. Gypsum may typically be used in the CT technology as a coagulant while polyelectrolytes, generally polyacrylamides of high density, may generally be used as flocculants in the paste technology. Flocculants, or flocculating agents, are typically chemicals that promote flocculation by causing colloids and other suspended particles in liquids to aggregate, thereby forming a floe. Flocculants are generally used in water treatment processes to improve the sedimentation or filterability of small particles.

Various inorganic and/or organic flocculants are typically used in tailings treatments. The adequate dosage of gypsum and/or flocculants during the tailings disposition may improve the oil sands process efficiency because these substances may act as modifiers of the interaction forces responsible for holding particles together. Consequently, the addition of these chemicals may enhance the settling rate of tailings and may promote the recovery of water and its recirculation in the oil sands process.

Flocculants that comprise polyacrylamide are a commonly used chemical treatment for dewatering oil sands tailings.

BRIEF SUMMARY

The present embodiments generally pertain to a composition comprising one or more dry acid polymer ("DAP") and/or one or more dry acid polymer with salts ("DAPS"), wherein said one or more DAP and/or one or more DAPS comprises at least one anionic monomer that is neutral at low pH (group 2 monomer), and has a ratio of group 2 monomer acid to group 2 monomer salt that is greater or equal to about 0.02. In exemplary embodiments, the at least one group 2 monomer may comprise acrylic acid monomer, and the one or more DAP and/or one or more DAPS may have a ratio of acrylic acid to acrylate salt that is greater or equal to about 0.02. In further exemplary embodiments, the at least one group 2 monomer may comprise methacrylic acid monomer, and the one or more DAP and/or one or more DAPS may have a ratio of methacrylic acid to methacrylate salt that is greater or equal to about 0.05. Moreover, in exemplary embodiments, said one or more DAP and/or one or more DAPS may have a lower viscosity than a comparable dry polyacrylamide ("DPAM") polymer that was synthesized at a pH value of greater than 6.5. In some embodiments, said one or more DAP and/or one or more DAPS may have a solution viscosity in process water which is less than about 90% of the viscosity of said comparable DPAM polymer. In some embodiments, the at least one of the anionic monomers that is neutral at low pH (group 2 monomer) may be selected from: acrylic acid, methacrylic acid, maleic acid monomers, any monomer substituted with a carboxylic acid group, or salt of any of the foregoing, or combination thereof. In further embodiments, said one or more DAP and/or one or more DAPS further may comprise one or more monomers selected from: a. nonionic monomers (group 1 monomers); and/or b. anionic monomers that are anionic at low pH (group 3 monomers); and/or c. cationic monomers (group 4 monomers). Moreover, in some embodiments, said one or more nonionic monomers (group 1 monomers) may be selected from: acrylamide, methacrylamide, vinyl monomers, allyl monomers, ethyl monomers, N-vinylpyridine, N-vinylimidazole, isopropylacrylamide, isopropylmethacrylamide, polyethylene glycol methacrylate, and combinations thereof. In some embodiments, any of said one or more nonionic monomers (group 1 monomers) may be substituted with a side chain selected from: an alkyl, arylalkyl, dialkyl, ethoxyl, and/or hydrophobic group. Furthermore, in some embodiments, said one or more anionic monomers that are anionic at low pH (group 3 monomers) may be selected from: sulfonic acids, a sulfonic acid group, 2-acrylamido-2-methylpropane sulfonic acid ("ATBS"), and combinations thereof. In further embodiments, said one or more cationic monomers (group 4 monomers) may be selected from: acryloyloxyethyltrimethylammonium chloride, methacryloyloxyethyltrimethylammonium chloride, methacrylamidopropyltrimethylammonium chloride, acrylamidopropylammonium chloride, methacryloyloxyethyldimethylammonium sulfate, dimethylaminoethyl acrylate, dimethylaminopropylmethacrylamide, diallyldimethylammonium chloride, and combinations thereof. Moreover, in some embodiments, said one or more DAP and/or one or more DAPS may have a weight average molecular weight of greater than about 1,000,000 Daltons. In some embodiments, said one or more DAP and/or one or more DAPS may comprise from about 5 mol % to about 100 mol % of the at least one group 2 monomer. In further embodiments, said one or more DAP and/or one or more DAPS may comprise from about 20 mol % to about 45 mol % of at least one group 2 monomer. In some embodiments, said one or more DAP and/or one or more DAPS may comprise from about 0.5 mol % to about 5 mol % of the one or more cationic monomers (group 4 monomers).

Additionally, in exemplary embodiments, a tailings composition may comprise solids, water, and a polymer composition discussed herein, wherein said tailings composition may comprises from 50 to about 2000 grams of said one or more DAP and/or one or more DAPS per dry ton of solid tailings (g/t). Moreover, in exemplary embodiments, an oil sands composition may comprise oil sands process-affected water and from about 0.01-2% by weight of a polymer composition discussed herein. In further exemplary embodiments, a tailings composition may comprise a dilute tailings suspension, and from about 0.01% to about 0.5% of a polymer composition discussed herein. In some embodiments, a tailings composition may comprise a concentrated tailings suspension and from about 0.1% to about 5.0% of a polymer composition discussed herein.

The present disclosure also generally relates to a method of synthesizing a DAP or DAPS, comprising: a. providing a monomer mixture comprising one or more anionic monomers that are neutral at low pH (group 2 monomers); b. polymerizing the monomer mixture to produce a polymer gel, wherein the polymerization is initiated at a pH of 6.0 or less, or adjusted to a pH of 6.0 or less prior to completion of the polymerization; and c. drying the polymer gel to produce a DAP or DAPS. In exemplary embodiments, the DAP or DAPS may have a ratio of group 2 monomer acid to group 2 monomer salt that is greater or equal to about 0.02. In exemplary embodiments, the polymerization may be in the presence of one or more salts, and the resultant polymer is a DAPS. Furthermore, in some embodiments, substantially no caustic agent may be added prior to polymerization. Moreover, in some embodiments, a caustic agent may be added prior to polymerization in an amount sufficient to produce a DAP or DAPS having a ratio of group 2 monomer acid to group 2 monomer salt that is greater or equal to about 0.02. In some embodiments, said method may comprise adding an acid prior to or during polymerization. In some embodiments, said acid may be sulfuric acid. In some embodiments, the at least one anionic monomer that is neutral at low pH (group 2 monomer) may be selected from: acrylic acid, methacrylic acid, maleic acid monomers, any monomer substituted with a carboxylic acid group, or salt of any of the foregoing, and combinations thereof. In further embodiments, the monomer mixture may further comprise one or more monomers selected from: a. Nonionic monomers (group 1 monomers); and/or b. Anionic monomers that are anionic at low pH (group 3 monomers); and/or c. Cationic monomers (group 4 monomers). In some embodiments, said one or more nonionic monomers (group 1 monomers) may be selected from: acrylamide, methacrylamide, vinyl monomers, allyl monomers, ethyl monomers, N-vinylpyridine, N-vinylimidazole, isopropylacrylamide, isopropylmethacrylamide, polyethylene glycol methacrylate, and combinations thereof. Furthermore, in some embodiments, any of said one or more nonionic monomers (group 1 monomers) may be substituted with a side chain selected from: an alkyl, arylalkyl, dialkyl, ethoxyl, and/or hydrophobic group. In some embodiments, said one or more anionic monomers that are anionic at low pH (group 3 monomers) may be selected from: sulfonic acids, a sulfonic acid group, 2-acrylamido-2-methylpropane sulfonic acid ("ATBS") or combination thereof. In further embodiments, said one or more cationic monomers (group 4 monomers) may be selected from: acryloyloxyethyltrimethylammonium chloride, methacryloyloxyethyltrimethylammonium chloride, methacrylamidopropyltrimethylammonium chloride, acrylamidopropylammonium chloride, methacryloyloxyethyldimethylammonium sulfate, dimethylaminoethyl acrylate, dimethylaminopropylmethacrylamide, diallyldimethylammonium chloride, and combinations thereof. In some embodiments, a composition may comprise one or more DAP and/or one or more DAPS and may be produced by any of the methods discussed herein.

Furthermore, the present disclosure generally pertains to a process of treating tailings which comprise water and solids, the process comprising: a. adding to the tailings one or more DAP and/or one or more DAPS that comprises at least one anionic monomer that is neutral at low pH (group 2 monomer), and has a ratio of group 2 monomer acid to group 2 monomer salt that is greater or equal to about 0.02; b. allowing at least a portion of the solids to flocculate; and c. separating at least a portion of the flocculated solids from the tailings. In exemplary embodiments, the at least one group 2 monomer may comprise an acrylic acid monomer, and the one or more DAP and/or one or more DAPS may have a ratio of acrylic acid to acrylate salt that is greater or equal to about 0.02. Furthermore, in exemplary embodiments, the at least one group 2 monomer may comprise methacrylic acid monomer, and the one or more DAP and/or one or more DAPS may have a ratio of methacrylic acid to methacrylate salt that is greater or equal to about 0.05. In exemplary embodiments, polymerization of the one or more DAP and/or one or more DAPS may be initiated at a pH value of about 6.0 or less, or may be adjusted to a pH value of about 6.0 or less prior to completion of polymerization. In exemplary embodiments, the tailings may be oil sands tailings. In some embodiments, said one or more DAP and/or one or more DAPS may comprise acrylamide monomers and acrylic acid monomers. In some embodiments, said one or more DAPS may comprise acrylamide and acrylate salts with up to stoichiometric amounts of acid. In some embodiments, said one or more DAPS may be produced by polymerizing acrylamide and acrylic acid in the presence of one or more salts. In some embodiments, said acid may be sulfuric acid.

In further embodiments, said one or more anionic monomers that are neutral at low pH (group 2 monomers) may be selected from acrylic acid, methacrylic acid, maleic acid monomers, any monomer substituted with a carboxylic acid group, or salt of any of the foregoing, and combinations thereof. In exemplary embodiments, said one or more DAP and/or one or more DAPS may further comprise one or more monomers that may be selected from: a. nonionic monomers (group 1 monomers); and/or b. anionic monomers that are anionic at low pH (group 3 monomers); and/or c. cationic monomers (group 4 monomers). Furthermore, in some embodiments, said one or more nonionic monomers (group 1 monomers) may be selected from: acrylamide, methacrylamide, vinyl, allyl, and ethyl monomers, N-vinylpyridine, N-vinylimidazole, isopropylacrylamide, isopropylmethacrylamide, polyethylene glycol methacrylate, and combinations thereof. In some embodiments, any of said one or more nonionic monomers (group 1 monomers) may be substituted with a side chain selected from: an alkyl, arylalkyl, dialkyl, ethoxyl, and/or hydrophobic group. In some embodiments, said one or more anionic monomers that are anionic at low pH (group 3 monomers) may be selected from: sulfonic acids or a sulfonic acid group, 2-acrylamido-2-methylpropane sulfonic acid ("ATBS"), and combinations thereof. Moreover, in some embodiments, said one or more cationic monomers (group 4 monomers) may be selected from: acryloyloxyethyltrimethylammonium chloride, methacryloyloxyethyltrimethylammonium chloride, methacrylamidopropyltrimethylammonium chloride, acrylamidopropylammonium chloride, methacryloyloxyethyldimethylammonium sulfate, dimethylaminoethyl acrylate, dimethylaminopropylmethacrylamide, diallyldimethylammonium chloride, and combinations thereof. In some embodiments, said one or more DAP and/or one or more DAPS may have a weight average molecular weight above 1,000,000 Da. In some embodiments, said one or more DAP and/or one or more DAPS may comprise from about 5 to about 100 mol % of the at least one anionic monomers that are neutral at low pH (group 2 monomers). In some embodiments, said one or more DAP and/or one or more DAPS may comprise from about 20 mol % to about 45 mol % of the at least one anionic monomers that are neutral at low pH (group 2 monomers). In exemplary embodiments, said tailings may be oil sands tailings. In some embodiments, said one or more DAP and/or one or more DAPS may be added to tailings to provide between about 50 and about 2000 grams per dry ton of solid tailings (g/t). In some embodiments, said one or more DAP and/or one or more DAPS may be added to oil sands process-affected water to provide about 0.01-2% by weight of polymer in the process affected water. In some embodiments, said one or more DAP and/or one or more DAPS may be applied to a dilute tailings suspension to provide a solution concentration of about 0.01 to 0.05%. In some embodiments, said one or more DAP and/or one or more DAPS may be applied to the concentrated tailings suspension to provide a concentration of about 0.4% to about 1.0%. In further embodiments, separation of solids from tailings may be by centrifuge, hydrocyclone, decantation, filtration, thickening or another mechanical separation.

DETAILED DESCRIPTION

Definitions

Figure 1:
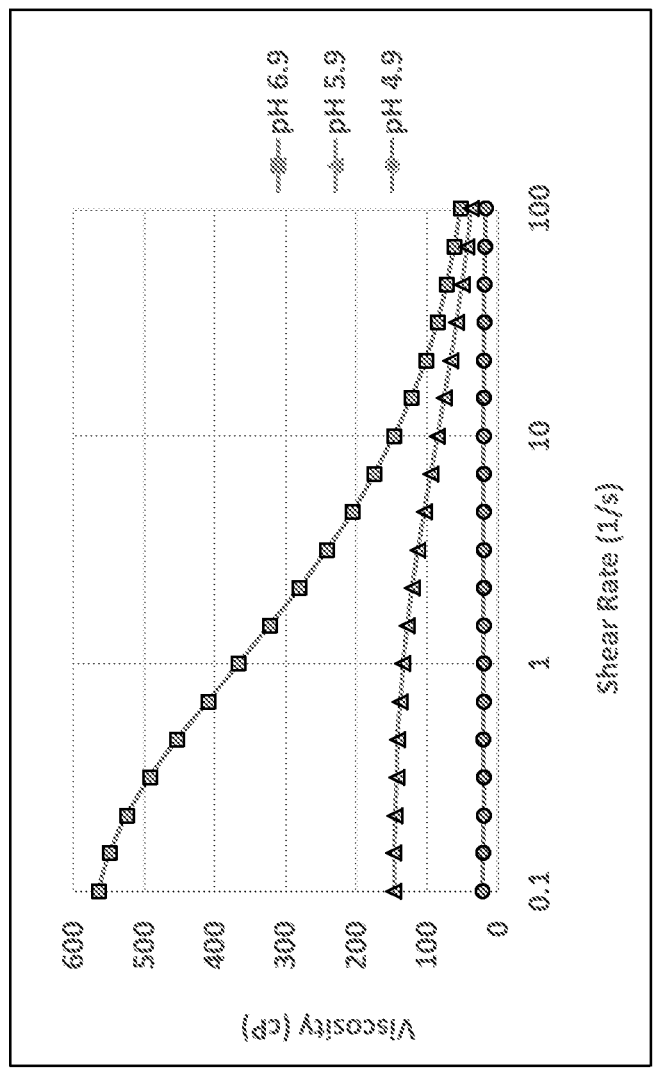
FIG. 1 presents data related to an experiment that evaluated viscosity vs. shear rate for dry copolymers which comprised acrylamide/calcium diacrylate at three different polymerization initiation pH values (6.9, 5.9, and 4.9). Solutions were made at 0.4% by weight in oil sands process-affected water ("OSPW").

The embodiments disclosed herein generally relates to compositions comprising one or more dry acid polymers ("DAP") and/or one or more dry acid polymers in combination with one or more salts ("DAPS"), and methods of using said compositions, e.g., as a flocculant, in disposing of, reclaiming, treating, and/or dewatering tailings, e.g., oil sands tailings.

As used herein the singular forms "a", "and", and "the" include plural referents unless the context clearly dictates otherwise. All technical and scientific terms used herein have the same meaning as commonly understood to one of ordinary skill in the art to which this invention belongs unless clearly indicated otherwise.

As used herein, the terms "tailings" and "tailings stream" generally refer to the discarded materials that may be generated in the course of extracting a valuable material from an ore. Exemplary tailings include, but are not limited to, tailings from coal, copper, gold mining and mineral processing. Exemplary tailings also include tailings from the processing of oil sands. While many of the exemplary embodiments are described with reference to oil sands tailings, it is understood that the exemplary compositions, processes, and methods are not limited to applications in oil sands tailings, but also can be applied to various other tailings. The term tailings is meant to be inclusive of but not limited to any of the types of tailings discussed herein, e.g., process oil sand tailings, in-process tailings, oil sands tailings, and the like.

The terms "process oil sand tailings", "oil sands tailings stream", or "oil sands tailings", generally refer to tailings that may be directly generated as bitumen is extracted from oil sands. In tar sand processing, tailings may comprise the oil sands, and any net additions of process water less the recovered bitumen.

Any tailings fraction obtained from the process, such as tailings from primary separation cell, primary flotation and secondary flotation, process tailings, froth treatment tailings, and mature fine tailings or combination thereof, may be treated by the exemplary processes described herein. The tailings may comprise a colloidal sludge suspension comprising clay minerals and/or metal oxides/hydroxides. In exemplary embodiments, the tailings stream may comprise water and solids.

Tailings generally comprise mineral solids having a variety of particle sizes. Mineral fractions with a particle diameter greater than 44 microns may be referred to as "coarse" particles, or "sand." Mineral fractions with a particle diameter less than 44 microns may be referred to as "fines" and may essentially be comprised of silica and silicates and clays that may be easily suspended in the water. Ultrafine solids (<1 μm) may also be present in the tailings stream and may be primarily composed of clays. The tailings may include but are not limited to including one or more of the coarse particles, fine tailings, MFT, FFT, or ultrafine solids.

The oil sands tailings may additionally include but are not limited to including one or more of any of the tailings streams that may be produced in a process to extract bitumen from an oil sands ore. In some embodiments, the tailings, may comprise paraffinic or naphthenic tailings, for example paraffinic froth tailings. The tailings, may be combined into a single tailings stream for dewatering or each tailings stream may be dewatered individually.

In some embodiments, the tailings stream may be produced from an oil sands ore and may comprise water and solids, for example sand and fines. In exemplary embodiments, the tailings stream, e.g., oil sands tailings stream, may comprise at least one of the coarse tailings, fluid fine tailings, MFT, fine tailings, and ultrafine tailings. In some embodiments, the processes may be used to treat ultrafine solids. In some embodiments, the tailings stream, e.g., oil sands tailings stream, may comprise a fine (particle size <44 μm) content of about 10 to about 100 wt %, about 20 to about 100 wt %, about 30 to about 100 wt %, or about 40 to about 90 wt % of the dry tailings. In some embodiments, the tailings stream may comprise about 0.01 to about 5 wt % of bitumen. In some embodiments, the oil sands ore tailings stream may comprise process tailings.

Any of the above terms referencing "tailings" additionally generally comprises fluid fine tailings ("FFT") such as mature fine tailings ("MFT") from tailings ponds and fine tailings from ongoing extraction operations (for example, froth treatment tailings or thickener underflow) which may bypass a tailings pond.

As used herein, "fines" generally may refer to mineral fractions that may comprise a particle diameter less than 44 microns.

As used herein, "fluid fine tailings" or "FFT" may comprise a liquid suspension of oil sand fines in water with a solids content greater than 2%.

The term "mature fine tailings" ("MFT") generally may refer to fine tailings that may comprise a solids content of about 30-35%, and that generally may comprise almost entirely solids <44 microns. MFT generally may behave as a fluid-like colloidal material. MFT may comprise FFT with a low sand to fines ratio ("SFR"), i.e., generally less than about 0.3, and a solids content that may be generally greater than about 30%.

As used herein, "sand" generally may refer to mineral fractions that may comprise a particle diameter greater than 44 microns.

As used herein, the term "coagulant" generally may refer to an agent that may typically destabilize colloidal suspensions.

As used herein, the terms "polymer," "polymers," "polymeric," and similar terms are used in their ordinary sense as understood by one skilled in the art, and thus may be used herein to refer to or describe a large molecule (or group of such molecules) that may comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by, e.g., polymerizing, a particular monomer. Unless otherwise specified, a polymer may also comprise a "copolymer" that may comprise two or more different recurring units that may be formed by, e.g., copolymerizing, two or more different monomers, and/or by chemically modifying one or more recurring units of a precursor polymer. Unless otherwise specified, a polymer or copolymer may also comprise a "terpolymer" that may comprise polymers that may comprise three or more different recurring units. Any one of the one or more polymers discussed herein may be used in any applicable process, e.g., as a flocculant.

As used herein the term "nonionic monomer" generally refers to a monomer that possesses a neutral charge. Exemplary nonionic monomers may comprise but are not limited to comprising monomers selected from the group consisting of, acrylamide, methacrylamido, vinyl, allyl, ethyl, and the like, all of which may be substituted with a side chain selected from, for example, an alkyl, arylalkyl, dialkyl, ethoxyl, and/or hydrophobic group. In exemplary embodiments, the one or more nonionic monomers are selected from the group consisting of: acrylamide, methacrylamide, N-vinylpyridine, N-vinylimidazole, isopropylacrylamide, isopropylmethacrylamide and polyethylene glycol methacrylate. Said nonionic monomers may be referred to as "group 1 monomers" herein.

As used herein, the term "anionic monomers" may refer to either anionic monomers that are substantially anionic in whole or (in equilibrium) in part, at a pH in the range of about 6.0 to about 8.0. The "anionic monomers" may be neutral at low pH (from a pH of about 2 to about 6), or to anionic monomers that are anionic at low pH. Anionic monomers that are neutral at low pH may be referred to as "group 2 monomers" herein. Anionic monomers that are anionic at low pH may be referred to as "group 3 monomers" herein.

Examples of group 2 monomers comprise but are not limited to comprising acrylic, methacrylic, maleic monomers and the like, additional examples include but not limited to any monomer substituted with a carboxylic acid group or salt thereof. In exemplary embodiments, group 2 monomers which may be substituted with a carboxylic acid group include, for example, acrylic acid, and methacrylic acid. Another exemplary monomer is a (meth)acrylamide monomer wherein the amide group has been hydrolyzed to a carboxyl group. Said monomer may be a derivative or salt of a monomer according to the embodiments.

Examples of group 3 monomers comprise but are not limited to comprising sulfonic acids or a sulfonic acid group, or both. In some embodiments, the group 3 monomers may comprise a sulfonic function that may comprise, for example, 2-acrylamido-2-methylpropane sulfonic acid ("ATBS").

As used herein, the term "cationic monomer" generally refers to a monomer that possesses a positive charge. Said cationic monomers may be referred to as "group 4 monomers" herein. Exemplary cationic monomers may comprise but are not limited to comprising acryloyloxyethyltrimethylammonium chloride, methacryloyloxyethyltrimethylammonium chloride, methacrylamidopropyltrimethylammonium chloride, acrylamidopropyltrimethylammonium chloride, methacryloyloxyethyldimethylammonium sulfate, dimethylaminoethyl acrylate, dimethylaminopropylmethacrylamide, and/or diallyldimethylammonium chloride.

Said cationic monomers may also comprise but are not limited to comprising dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. Alkyl groups may generally be $C_{1-8}$ alkyl.

As used herein, the terms "DPAM" and "DPAM polymers" generally refers to polymers comprising dry polyacrylamide (DPAM), as opposed to solution or emulsion form. DPAM polymers generally may be produced dry, and, therefore, acrylic acid may generally be converted to acrylate prior to polymerization. In general, polymerization of polymers of acrylamide and acrylate typically may include the use of either sodium acrylates or acrylic acid. When acrylic acid may be used, sodium hydroxide may also be added to form sodium acrylate prior to polymerization. In other cases, caustic agents may be used such as those containing potassium or calcium to form potassium or calcium acrylate. DPAMs generally may comprise a higher active content as compared to solution or emulsion forms. DPAMs may generally comprise polymers of polyacrylamide with sodium acrylate. The acrylate group may impart negative charge on the polymer and, therefore, the anionic charge may be controlled by the ratio of acrylamide to acrylate.

As used herein, the term "dry acid polymers" ("DAP"), generally refers to polymers that comprises one or more group 2 monomers, and has a pH of less than about 6. DAP may comprise polymers that may have been polymerized from acrylamide and acrylic acid monomers wherein no caustic, or less than stoichiometric amounts of caustic agents were added prior to polymerization DAP may comprise polymers that may have been polymerized wherein the pH of polymerization initiation was at a value of 6.0 or below or wherein the pH value of the polymer gel was converted to 6.0 or less following polymerization and prior to drying.

Exemplary DAP may optionally further comprise one or more group 1 monomers and/or one or more group 3 monomers and/or one or more group 4 monomers. Exemplary DAP may comprise from about 5 to about 100 mol % of the one or more group 2 monomer(s). Exemplary DAP may optionally further comprise from 0 to about 95 mol % of the one or more group 1 monomer(s). Exemplary DAP may optionally further comprise from 0 to about 95 mol % of the one or more group 3 monomer(s), e.g., about 0 to about 15 mol %. Exemplary DAP may optionally further comprise from 0 to about 95% of the one or more group 4 monomers, e.g., about 0 to about 15 mol %. An exemplary DAP may be characterized by a final (added or formed in situ: i.e. hydrolysis of AMD) acrylic acid+acrylate content (or any group 2 monomer) from about 5 to about 100 mol %, about 5 to about 50%, about 15% to about 40%, or about 20% to about 35%. An exemplary DAP may comprise from about 20 to about 45 mol % group 2 monomer(s). In some embodiments, DAP may comprise ATBS e.g., one comprising 60% AMID, 35% AA, and 5% ATBS. Any one of the said DAP discussed herein may be used in any applicable process, e.g., as a flocculant. DAP generally comprise a solution viscosity in process water which is less than 90% of the viscosity of a similar polymer synthesized above pH 6.5.

In exemplary embodiments, the DAP has an average molecular weight of greater than about 500,000; about 1,000,000; about 5,000,000; about 10,000,000; about 15,000,000; about 20,000,000; or about 25,000,000 Daltons. In exemplary embodiments, the DAP may have an average molecular weight in the range of about 1,000,000 to about 20 million Daltons. In exemplary embodiments, the DAP may have an average molecular weight above 1,000,000 Da.

As referred to herein, the term "dry acid polymer with salt" ("DAPS") generally refers to polymers that comprises one or more group 2 monomers, and has a pH of less than about 6. DAPS may comprise polymers that may have been polymerized wherein the pH of polymerization initiation was at a value of 6.0 or less, or the pH value of the polymer gel was converted to 6.0 or less following polymerization and prior to drying. Alternatively the DAPS may be produced by polymerizing acrylamide and acrylic acid in the presence of one or more salts, and further wherein the pH of polymerization initiation was at a value of 6.0 or less or the pH value of the polymer gel was converted to 6.0 or less following polymerization and prior to drying.

Exemplary DAPS may optionally further comprise one or more group 1 and/or one or more group 3 and/or one or more group 4 monomers. Exemplary DAPS may comprise DAP in combination with one or more salts. DAPS may comprise DAP with one or more salts. DAPS may comprise DAP with at least one salt. Exemplary DAPS may comprise from about 5 to about 100 mol % of the one or more group 2 monomer(s). Exemplary DAPS may further comprise from about 0 to about 95 mol % of the one or more group 1 monomers. Exemplary DAPS may optionally further comprise, about 0 to about 95 mol % of the one or more group 3 monomers, e.g., 0-15 mol %. Exemplary DAPS may optionally further comprise about 0 to about 95 mol % of the one or more group 4 monomers, e.g., 0-15 mol %. Exemplary DAPS may be characterized by a final (added or formed in situ: i.e. hydrolysis of AMD) acrylic acid+acrylate content (or any group 2 monomer) from about 5 to about 100 mol %, about 5 to about 50%, about 15% to about 40%, or about 20% to about 35%. Exemplary DAPS may comprise from about 20 to about 45 mol % group 2 monomer(s). Exemplary DAPS may comprise acrylamide and acrylate salts, generally with up to stoichiometric amounts of acid, such as but not limited to sulfuric acid, to convert acrylate to acrylic acid. In some embodiments, DAPS may comprise ATBS e.g., one comprising 60% AMD, 35% AA, and 5% ATBS.

In certain exemplary embodiments, DAPS may be produced at the point of use by dissolving in water or tailings or a tailings stream or oil sands process-affected water a dry polymer, such as a commercial, standard DPAM (containing acrylamide and acrylate), and adding stoichiometric amounts of an acid, such as but not limited to sulfuric acid, prior to, during, or after polymer dissolution. Any one of the said DAPS discussed herein may be used in any applicable process, e.g., as a flocculant. DAPS generally comprise a solution viscosity in process water which is less than 90% of the viscosity of a similar polymer synthesized above pH 6.5.

In exemplary embodiments, the DAPS has an average molecular weight of greater than about 500,000; about 1,000,000; about 5,000,000; about 10,000,000; about 15,000,000; about 20,000,000; or about 25,000,000 Daltons. In exemplary embodiments, the DAPS may have an average molecular weight in the range of about 1,000,000 to about 20 million Daltons. In exemplary embodiments, the DAPS may have an average molecular weight above 1,000,000 Da.

In general, the salt that may be present may comprise any naturally occurring or synthetically prepared salt. The salt in general may comprise one or more inorganic and/or organic salts. Said salt generally may comprise at least one kind of anion and at least one kind of cation, wherein the stoichiometry within the salt generally may depend on the negative valency of the at least one anion and on the positive valency of the at least one cation. Examples of anions that may be present in the at least one salt may comprise a selection of the group of inorganic anions including but not limited to chloride, nitrate, bromide, iodide, carbonate, phosphate, sulfate, and mixtures thereof. Examples of cations that may be present in the at least one salt may comprise a selection from the group of inorganic cations including but not limited to like lithium, sodium, potassium, rubidium, cesium, francium, beryllium, magnesium, strontium, barium, radium, aluminium, and mixtures thereof. The salt may comprise a transition metal, for example an iron salt. In some embodiments, the salt may comprise a post-transition metal, for example an aluminum salt.

In some exemplary embodiments, the DAP and/or DAPS may be provided in neat form. In other exemplary embodiments, the DAP and/or DAPS may be provided in a composition comprising one or more additional polymers and or additives. In certain embodiments, a composition may comprise one or more DAP and/or one or more DAPS.

As used herein, the term "flocculant" may generally refer to a reagent that may bridge neutralized or coagulated particles into larger agglomerates, typically resulting in more efficient settling. In exemplary embodiments, the flocculant may comprise any one or more of the polymers and/or any one of the compositions discussed herein, e.g., one or more DAP polymers and/or one or more DAPS polymers, or compositions comprising one or more of the DAP and/or DAPS polymers.

Polymers, Compositions, Methods, and Processes

Disclosed herein are compositions comprising one or more DAP and/or one or more DAPS, wherein said one or more DAP and/or one or more DAPS comprises at least one anionic monomer that is neutral at low pH (group 2 monomer), and has a ratio of group 2 monomer acid to group 2 monomer salt that is greater or equal to about 0.02. In exemplary embodiments, the at least one group 2 monomer may comprise acrylic acid monomer, and the one or more DAP and/or one or more DAPS may have a ratio of acrylic acid to acrylate salt that is greater or equal to about 0.02. In further exemplary embodiments, the at least one group 2 monomer may comprise methacrylic acid monomer, and the one or more DAP and/or one or more DAPS may have a ratio of methacrylic acid to methacrylate salt that is greater or equal to about 0.05. Said compositions may be used for improving the disposing of, reclaiming, treating, and/or dewatering tailings, e.g., oil sands tailings, e.g., through use of a composition comprising one or more dry acid polymers (DAP) and/or one or more DAPS in any of the processes and/or methods described herein and/or any methods or processes used for the treatment of tailings. Furthermore said compositions may generally be used for treating oil sands tailings in need of solid-liquid separation, e.g., in order to efficiently recycle water and to reduce the volume of tailings which may be transferred to a dedicated disposal area and/or a tailings pond. Use of the compositions described herein may enhance flocculation and may enhance separation of separate the solids. By using these compositions, a faster settling rate and a more complete separation of the solids from the water may be achieved, improving process and/or method efficiency relative to conventional processes and/or methods for treating tailings streams which may not use the compositions described herein. The compositions may be used in methods and processes to enhance settling of solids, especially ultrafine solids and/or MFT, in tailings and particularly in oils sands and/or oil sands ore tailings streams. The compositions may be readily incorporated into current processes and methods and may provide economic and environmental benefits Moreover, disclosed herein are processes for improving the disposing of, reclaiming, treating, and/or dewatering tailings, e.g., oil sands tailings, e.g., through use of a composition comprising one or more dry acid polymers (DAP) and/or one or more DAPS, such as those described herein. Furthermore said processes may generally be used for treating oil sands tailings in need of solid-liquid separation, e.g., in order to efficiently recycle water and to reduce the volume of tailings which may be transferred to a dedicated disposal area and/or a tailings pond. Also disclosed herein are processes comprising the addition of one or more DAP and/or one or more DAPS, to an aqueous suspension of solids, followed by dewatering of the treated material by any combination of filtration, thickening, centrifugation, or deposition of the treated material in a dedicated disposal area or end-pit lake. Some processes may utilize one or more DAP and/or one or more DAPS, to enhance flocculation and to separate the solids. Exemplary processes may one or more DAP and/or one or more DAPS as one or more flocculants, e.g., to enhance flocculation and to separate the solids. By using these processes, a faster settling rate and a more complete separation of the solids from the water may be achieved, improving process efficiency relative to conventional processes for treating tailings streams. The processes may be used to enhance settling of solids, especially ultrafine solids and/or MFT, in tailings and particularly in oils sands and/or oil sands ore tailings streams. The processes may be readily incorporated into current processing facilities and may provide economic and environmental benefits.

Further disclosed herein are compositions that may comprise one or more DAP and/or one or more DAPS, discussed herein. In exemplary embodiments, the one or more DAP and/or one or more DAPS, are produced in a process wherein the pH of polymerization initiation was at a value of 6.0 or less, 5.5 or less, 5.0 or less, 4.5 or less, 4.0 or less, 3.5 or less, 3.0 or less, or 2.5 or less. In other exemplary embodiments, the one or more DAP and/or one or more DAPS are polymerized and then the pH value of the polymer gel is converted to 6.0 or less, 5.5 or less, 5.0 or less, 4.5 or less, 4.0 or less, 3.5 or less, 3.0 or less, or 2.5 or less following polymerization and prior to drying.

In an exemplary embodiment, said composition may comprise one or more DAP and/or one or more DAPS, comprising one or more group 2 monomers. In exemplary embodiments, the composition comprises one or more DAP and/or one or more DAPs further comprising one or more group 1 and/or one or more group 3 and/or one or more group 4 monomers. In exemplary embodiment, said composition may comprise one or more polymers comprising ATBS. In some embodiments, said composition may comprise one or more polymers comprising about 60% AMD, 35% AA, and 5% ATBS.

In exemplary embodiments, said compositions may comprise one or more DAP and/or one or more DAPS, having an average molecular weight of greater than about 500,000; about 1,000,000; about 5,000,000; about 10,000,000; about 15,000,000; about 20,000,000; or about 25,000,000 Daltons. In exemplary embodiments, the one or more DAP and/or one or more DAPS, has an average molecular weight in the range of about 1,000,000 to about 20 million Daltons. In exemplary embodiments, the one or more DAP and/or one or more DAPS, has an average molecular weight above 1,000,000 Da.

In certain embodiments, the composition may comprise one or more DAP and/or one or more DAPS, that comprise from about 5 to about 100 mol % of the one or more group 2 monomers. In exemplary embodiments, the one or more DAP and/or one or more DAPS may further comprise from about 0 to about 95 mol % of the one or more group 1 monomers, and/or from about 0 to about 95 mol % of the one or more group 3 monomers, e.g., 0-15 mol %, and/or from about 0 to about 95 mol % of one or more group 4 monomers, e.g., 0-15 mol %. In an exemplary embodiment, the composition may comprise one or more DAP and/or one or more DAPS that may be characterized by a final (added or formed in situ: i.e. hydrolysis of AMD) acrylic acid+ acrylate content (or any group 2 monomer) from about 5 to about 100 mol %, about 5 to about 50%, about 15% to about 40%, or about 20% to about 35%. In exemplary embodiments, the one or more DAP and/or one or more DAPS may comprise from about 20 to about 45 mol % of group 2 monomers.

In another exemplary embodiment, the composition may comprise one or more DAP and/or one or more DAPS, comprising a cationic monomer of the group 4 monomers. In exemplary embodiments, the polymer comprises about 0.5 to about 15 mol % of the group 4 monomer(s), such as about 0.5% to about 10%, or about 0.5% to about 5%. In exemplary embodiments, the cationic charge of said one or more polymers may be between 0.5 and 5 mol %.

In exemplary embodiments, the composition may comprise one or more additional polymers or additives. Exemplary additives may comprise but are not limited to coagulants, surfactants, anti-foaming agents, polymers, flocculants, dispersants, mineral oils, mixture thereof, and other necessary or desired additives. For example, the composition may comprise one or more cationic coagulants or cationic flocculants. Exemplary cationic flocculants or coagulants may include, but are not limited to: a poly (diallyldimethyl ammonium chloride) compound; an epi-polyamine compound; a polymer that may comprise one or more quaternized ammonium groups, such as acryloyloxy-ethyltrimethylammonium chloride, methacryloyloxyethylt-rimethylammonium chloride, methacrylamidopropyltrim-ethylammonium chloride, acrylamidopropyltrimethylammonium chloride; or a mixture thereof. In some embodiments, the composition may comprise one or more inorganic coagulants. Exemplary inorganic coagulants may, for example, reduce, neutralize or invert electrical repulsions between particles. Exemplary inorganic coagulants may comprise but are not limited to inorganic salts such as aluminum sulfate, polyaluminum chloride, polyaluminum silica sulfate, ferric chloride, ferrous chloride, ferric sulfate, ferrous sulfate, lime, calcium chloride, calcium sulfate, magnesium chloride, or various commercially available iron or aluminum salts coagulants.

In exemplary embodiments, the composition comprising the one or more DAP and/or one or more DAPS may be in dry form. For example, the one or more DAP and/or one or more DAPS may by dry blended alone, or with the one or more other polymers or additives. In other exemplary embodiments the composition comprising the one or more DAP and/or one or more DAPS may be provided in other forms, including but not limited to solution, emulsion, suspension, dispersion, slurry, or other forms.

Exemplary embodiments discussed herein generally relate to the use of any one or more compositions and/or one or more DAP and/or one or more DAPS, as flocculants, generally for treating tailings, e.g., oil sands tailings, in need of solid-liquid separation, e.g., in order to efficiently recycle water and/or to reduce the volume of tailings which may be transferred to a tailings pond.

Exemplary embodiments discussed herein generally relate to the use of one or more compositions and/or one or more DAP and/or one or more DAPS, as flocculants, and wherein said use may result in a faster settling rate and a more complete separation of the solids from water in tailings, thereby improving process efficiency relative to conventional processes for treating tailings streams.

In some embodiments, processes for treating a tailings stream which may comprise water and solids may comprise: (i) adding a composition comprising one or more DAP or one or more DAPS polymers to the tailings stream; (ii) allowing at least a portion of the solids to flocculate; and (iii) separating at least a portion of the flocculated solids from the tailings stream. In some embodiments, the addition of the composition comprising one or more DAP and/or one or more DAPS polymers, to the tailings stream may result in the formation of flocculated solids.

In exemplary embodiments, processes for treating a tailings stream which may comprise water and solids may comprise: (i) adding one or more DAP and/or one or more DAPS to the tailings stream; (ii) allowing at least a portion of the solids to flocculate; and (iii) separating at least a portion of the flocculated solids from the tailings stream. In some embodiments, the addition of the one or more DAP and/or one or more DAPS, to the tailings stream may result in the formation of flocculated solids. In some embodiments, the DAPS may be produced at the point of use by dissolving in the tailings stream a standard DPAM, i.e., one that may contain acrylamide and acrylate, along with adding stoichiometric amounts of acid, such as but not limited to sulfuric acid, prior to, during, or after polymer dissolution.

In exemplary embodiments, processes for treating a tailings stream, which may comprise water and solids, may comprise: a. adding a composition comprising one or more DAP and/or one or more DAPS whose application solution was converted to a pH value of 6.0 or less following polymer dissolution and prior to, or with addition to the MFT; b. allowing at least a portion of the solids to flocculate; and c. separating at least a portion of the flocculated solids from the tailings stream.

In some embodiments, the composition comprising the one or more DAP and/or one or more DAPS, may include, for example, flocculant-grade homopolymers, copolymers, and terpolymers prepared from monomers. In some embodiments, the one or more DAP and/or one or more DAPS, may be linear, branched, or crosslinked. In some embodiments, said one or more DAP and/or one or more DAPS, may have an average molecular weight of greater than about 500,000; about 1,000,000; about 5,000,000; about 10,000,000; about 15,000,000; about 20,000,000; or about 25,000,000 Daltons. In some embodiments, said one or more DAP and/or one or more DAPS, may have an average molecular weight in the range of about 1,000,000 to about 20 million Daltons. In some embodiments, said one or more DAP and/or one or more DAPS, may have an average molecular weight in the range of about 1,000,000 to about 20 million Daltons. In exemplary embodiments, the one or more DAP and/or one or more DAPS, may comprise an average molecular weight above 1,000,000 Da.

In exemplary embodiments, said one or more DAP and/or one or more DAPS, may comprise polymers that were formed wherein the pH of polymerization initiation was at a value of 6.0 or less, 5.5 or less, 5.0 or less, 4.5 or less, 4.0 or less, 3.5 or less, 3.0 or less, or 2.5 or less. In exemplary embodiments said one or more DAP and/or one or more DAPS may comprise polymers for which the pH value of the polymer gel was converted to about 6.0 or less, 5.5 or less, 5.0 or less, 4.5 or less, 4.0 or less, 3.5 or less, 3.0 or less, or 2.5 or less following polymerization, e.g., prior to drying.

In an exemplary embodiment, said one or more DAP and/or one or more DAPS, may comprise one or more group 2 monomers. In an exemplary embodiment, said one or more DAP and/or one or more DAPS may optionally further comprise one or more group 1 monomer. In an exemplary embodiment, said one or more DAP and/or one or more DAPS may optionally further comprise one or more group 3 monomer. In an exemplary embodiment, said one or more DAP and/or one or more DAPS may optionally further comprise one or more group 4 monomer. In an exemplary embodiment, said one or more DAP and/or one or more DAPS may comprise ATBS. In some embodiments, said one or more DAP and/or one or more DAPS may comprise about 60% AMD, about 35% AA, and about 5% ATBS.

In certain embodiments, said one or more DAP and/or one or more DAPS, may comprise about 5 to about 100 mol % of the one or more group 2 monomers. In an exemplary embodiment, said one or more DAP and/or one or more DAPS may optionally further comprise from about 0 to about 95 mol % of the one or more group 1 monomers. In an exemplary embodiment, said one or more DAP and/or one or more DAPS may optionally further comprise from about 0 to about 95 mol % of the group 3 monomers, e.g., 0-15 mol %. In an exemplary embodiment, said one or more DAP and/or one or more DAPS may optionally further comprise from about 0 to about 95 mol % of the one or more group 4 monomers, e.g., 0-15 mol %. In an exemplary embodiment, said one or more DAP and/or DAPS may be characterized by a final (added or formed in situ: i.e. hydrolysis of AMD) acrylic acid+acrylate content (or any group 2 monomer) from about 5 to about 100 mol %, about 5 to about 50%, about 15% to about 40%, or about 20% to about 35%. In exemplary embodiments, the one or more DAP and/or DAPS may comprise between 20 and 45 mol % of the one or more group 2 monomers.

In another embodiment, said one or more DAP and/or one or more DAPS from about 0.5 to about 15 mol %, about 0.5% to about 10%, or about 0.5% to about 5% of the one or more group 4 cationic monomers. In exemplary embodiments, the cationic charge of said one or more DAP and/or DAPS may be between 0.5 and 5 mol %.

In exemplary embodiments, the one or more DAP and/or one or more DAPS comprise acrylamide and acrylic acid monomers that were polymerized without the addition of caustic agents prior to polymerization or with the addition of less than stoichiometric amounts of caustic agents prior to polymerization.

In exemplary embodiments, the one or more DAPS may have been produced by, but not limited to being produced by, one of the following: 1) the DAPS was produced by polymerizing acrylamide and acrylate salts with up to stoichiometric amounts of acid to convert acrylate to acrylic acid; 2) the DAPS was produced by polymerizing acrylamide and acrylic acid in the presence of salt; or 3) the DAPS was produced at the point of use by dissolving in water or tailings or a tailings stream or oil sands process-affected water a dry polymer, such as a DPAM that may comprise acrylamide and acrylate, and adding the stoichiometric amounts of acid prior to, during, or after polymer dissolution.

In some embodiments, the one or more DAP comprises a copolymer of acrylic acid and acrylamide. In an exemplary embodiment, the one or more DAP comprises a polymer and one or more salts, e.g., a copolymer of acrylamide and an acrylate salt.

In some embodiments, said salts may be water soluble. In some embodiments, said salts may include alkali metal salts, for example a lithium salt, a sodium salt, a potassium salt, a rubidium salt, or a cesium salt. In some embodiments, the salt may comprise an alkaline earth metal salt, for example a beryllium salt, a magnesium salt, a calcium salt, a strontium salt or a barium salt. In some embodiments, the salt may comprise a transition metal, for example an iron salt. In some embodiments, the salt may comprise a post-transition metal, for example an aluminum salt.

In some embodiments, the one or more DAP and or one or more DAPS may comprise one or more monomers that may comprise a derivative or a salt of a monomer, for example an acrylate salt or salt of acrylic acid such as cation-containing acrylate or multivalent cation-containing acrylate. The cation of such monomers may comprise, for example, lithium, sodium, potassium, rubidium, cesium, beryllium, magnesium, calcium, strontium, barium, iron, aluminum or any suitable cation. In some embodiments, the one or more polymers that may be used as one or more flocculants may comprise calcium, magnesium, iron, or aluminum-containing copolymer, for example, a copolymer comprising divalent or multivalent acrylate and acrylamido monomers. In some embodiments, the one or more DAP and/or one or more DAPS may comprise a calcium, magnesium, iron, or aluminum-containing terpolymer, for example, a terpolymer that may comprise divalent or multivalent acrylate, acrylamido and ATBS monomers. In some embodiments, the one or more polymers e.g., which are for use as flocculants, may comprise one or more calcium-containing copolymers or terpolymers. In some embodiments, the one or more DAP and/or one or more DAPS may comprise one or more magnesium-containing copolymers or terpolymers. In some embodiments, the one or more DAP and/or one or more DAPS may comprise one or more iron-containing copolymers or terpolymers. In some embodiments, the one or more DAP and/or one or more DAPS may comprise one or more aluminum-containing copolymers or terpolymers.

In some embodiments, the total dosage of the composition and/or one or more DAP and/or one or more DAPS to be used in a process according to the invention, e.g., as one or more flocculants, may be any amount necessary to produce a necessary and/or desired result, e.g., separation of solids. The effective dosage amount may depend, at least in part, on the characteristics of the tailings stream, such as, for example, the solids content of the tailings stream, the clay content of the tailings stream (e.g., the clay to water ratio), or one or more other factors. In an exemplary embodiment, the total dosage of the composition and/or the one or more DAP and/or one or more DAPS may be sufficient to provide between about 50 and about 2000 grams of said one or more DAP and/or one or more DAPS per dry ton of solid tailings (g/t). In an exemplary embodiment the one or more DAP and/or one or more DAPS may be used as flocculants with tailings suspensions that may have a solids content of less than 20%, and the total dosage of said one or more DAP and/or one or more DAPS may be from about 50 to about 750 g/t, about 100 to about 500 g/t, or about 100 to about 300 g/t. In an exemplary embodiment the DAP and/or one or more DAPS may be used as flocculants for a concentrated tailings suspension having a solids content greater than 20%, and the total dosage of said one or more DAP and/or one or more DAPS may be from about 500 to about 2000 g/t, from about 700 to about 1800 g/t, or from about 700 to about 1500 g/t.

In some embodiments, the total dosage of the one or more DAP and/or one or more DAPS, e.g., when they are used as flocculants in processes as described herein, may be in the range of about 0.01-2% of said polymer in oil sands process-affected water, by weight. In exemplary embodiments, the one or more DAP and/or one or more DAPS may be applied to a dilute tailings suspension at a solution concentration of about 0.01% to about 0.5%, about 0.01% to about 0.1%, or about 0.01 to about 0.05% by weight. In an exemplary embodiment, the one or more DAP and/or one or more DAPS may be applied to a dilute tailings suspension at a concentration of about 0.01 to 0.05% by weight. In another embodiment, the one or more DAP and/or one or more DAPS may be applied to a concentrated tailings suspension at a solution concentration of about 0.1 to about 5.0%, about 0.1% to about 2%, about 0.4% to about 1.5%, or about 0.4% to about 1.2% by weight. In an exemplary embodiment, the one or more DAP and/or one or more DAPS may be applied to the concentrated tailings suspension at a concentration of about 0.4% to about 1.0% by weight.

In exemplary embodiments, the one or more DAP and/or one or more DAPS, e.g., for use as flocculants, may be in dry form. In exemplary embodiments, the one or more DAP and/or one or more DAPS may be combined with one or more other polymers and/or additives to provide a composition. In exemplary embodiments, the one or more DAP and/or one or more DAPS, and one or more polymers and/or additives may be premixed, for example as a dry blend.

In exemplary embodiments, the composition and/or one or more DAP and/or one or more DAPS, may be added to the tailings stream in dry form. In exemplary embodiments, the one or more DAP and/or one or more DAPS may be produced at the point of use by dissolving dry polymer, such as a DPAM comprising acrylamide and acrylate, in a tailings stream, and then adding stoichiometric amounts of acid prior to, during, or after polymer dissolution.

In some embodiments, the total dosage of the one or more DAP and/or one or more DAPS, e.g., for use as a flocculant in processes such as described herein, be any dosage that will achieve a necessary or desired result, e.g., desired separation of solids.

In exemplary embodiments, the separation step may be achieved by natural or gravity settling, e.g., in a tailings pond. In exemplary embodiments, the separation step may be accomplished by any means known to those skilled in the art, including but not limited to centrifuges, hydrocyclones, decantation, filtration, thickeners, or another mechanical separation method.

In exemplary embodiments, the process, particularly wherein said process may involve use of any of the one or more DAP and/or one or more DAPS, as described herein, may provide enhanced flocculation of solid materials in the tailings, better separation of the solids from water, an increased rate of separation of the solids from the water, and/or may expand the range of operating conditions which may be tolerated while still achieving the desired level of separation of solids from the water within a desired period of time.

The exemplary processes described herein, particularly processes involving use of any of the one or more DAP and/or one or more DAPS, described herein, may provide flocculated beds with higher densities, leading to compact beds that may dewater faster and may build yield strength faster than comparable treatments without the addition of the said one or more polymers. In an exemplary embodiment, the processes may accelerate dewatering of the tailings stream.

In some embodiments, the processes, particularly processes involving use of any of the one or more DAP and/or one or more DAPS, as discussed herein, may achieve a clarified water phase with about 0.5% to about 3.0% solids within 8 hours. In some embodiments, the processes may achieve a clarified water phase with less than about 0.5% solids within 8 hours. In some embodiments, the processes may achieve a clarified water phase with less than 0.01% solids within 24 hours.

In exemplary embodiments, the composition and/or the one or more DAP and/or one or more DAPS, may be added prior to and/or during a bitumen extraction process. In exemplary embodiments the composition and/or the one or more DAP and/or one or more DAPS, may be introduced to the process so that it contacts oil sands ore at a primary separation step or in a primary separation vessel.

In some embodiments, the composition and/or the one or more DAP and/or the one or more DAPS may be added in any mixing, conditioning, or separation step in the bitumen extraction process or treatment of oil sand ore tailings stream process. In some embodiments, the one or more DAP and/or the one or more DAPS when used as flocculants may be added at various points in the bitumen recovery/extraction process in order to achieve a desired result.

In some embodiments, the composition and/or the one or more DAP and/or the one or more DAPS when used as flocculants such as processes described herein, may be added to the tailings stream before or after desanding. Desanding is typically a process wherein the tailings are settled for a period of time to form desanded tailings as the supernatant. Desanding may be done also for example by using a hydrocyclone.

In some embodiments, the composition and/or the one or more DAP and/or the one or more DAPS, e.g., when used as flocculants, may be used in the presence, or with the addition of, one or more additives. Such additives may comprise but are not limited to coagulants, surfactants, anti-foaming agents, polymers, flocculants, mineral oils, mixture thereof, and other necessary or desired additives. In some embodiments, the additives may be present in an amount of 0.01 to 50 weight percent based on a total weight of dry ore or tailings. For example, such additives may be added to the tailings stream at any point in the process in order to achieve a desired result, including simultaneously, before or after the step of adding the composition and/or the one or more DAP and/or the one or more DAPS according to the invention.

In some embodiments, the process using the composition and/or the one or more DAP and/or the one or more DAPS may provide efficient dewatering of the tailings and no other chemicals may be necessary as the addition of the one or more DAP and/or one or more DAPS, may be sufficient to provide for adequate dewatering.

According to some embodiments, the clays in the supernatant, which may be present as a very dilute suspension, may be flocculated using the composition and/or the one or more DAP and/or the one or more DAPS and may be separated from the tailings stream.

In some embodiments, the process may optionally comprise adding one or more cationic coagulants or cationic flocculants to the tailings stream. For example, the one or more cationic coagulants or flocculants may be added to the tailings stream before, after or at the same time as the addition of the composition and/or the one or more DAP and/or one or more DAPS. In some embodiments, a cationic coagulant or flocculant may be added to the supernatant. In some embodiments, the cationic flocculant or coagulant may comprise a poly(diallyldimethyl ammonium chloride) compound; an epi-polyamine compound; a polymer that may comprise one or more quaternized ammonium groups, such as acryloyloxyethyltrimethylammonium chloride, methacryloyloxyethyltrimethylammonium chloride, methacrylamidopropyltrimethylammonium chloride, acrylamidopropyltrimethylammonium chloride; or a mixture thereof. In some embodiments, one or more inorganic coagulants may be added to the tailings stream. An inorganic coagulant may, for example, reduce, neutralize or invert electrical repulsions between particles. Exemplary inorganic coagulants may comprise but are not limited to inorganic salts such as aluminum sulfate, polyaluminum chloride, polyaluminum silica sulfate, ferric chloride, ferrous chloride, ferric sulfate, ferrous sulfate, lime, calcium chloride, calcium sulfate, magnesium chloride, or various commercially available iron or aluminum salts coagulants.

In some embodiments, the composition and/or the one or more DAP and/or the one or more DAPS may be used in processes used to dewater the tailings so as to provide a solid material, e.g., one that possesses a desired yield strength. In exemplary embodiments, the resulting dewatered tailings may have sufficient yield strength so as to provide trafficable solids. In some embodiments, the dewatered tailings may comprise a yield stress of greater than about 5000 Pa after one year, or a yield stress of greater than about 10000 Pa within five years.

In some embodiments, the resulting dewatered solids may be handled or may be processed in any manner as necessary or desired. In some embodiments, the dewatered solids may be handled in compliance with governmental regulations. In some embodiments, the resultant solids may be disposed of, may be sent to a tailings pond for additional settling, or when solids may be a concentrated source of minerals, the solids may be used a raw materials or feed to produce compounds for commercial products. In some embodiments, the separated water may be handled or may be processed in any manner as necessary or desired. In an embodiment, the separated water may be recycled to the process ("recycled water"). For example, the recycled water may be added to the crushed oil sands ore for bitumen extraction. Recycled water may also be added to the process at any point where water may be added.

In some embodiments, the processes may be carried out at broad pH conditions, such as a pH ranging from about 6 to about 12, or about 8.5 to about 10.5. In some embodiments, the pH of the tailings stream is adjusted prior to the addition of the composition and/or one or more DAP and/or one or more DAPS. In some embodiments, the pH of the tailings stream is not adjusted prior to the addition of said one or more polymers according to the invention.

In some embodiments, processes using the composition and/or the one or more DAP and/or the one or more DAPS may be carried out at temperature of about 0° C. to about 100° C., or about ambient temperature to about 90° C., or about 20° C. to about 90° C.

In an embodiment, processes using the composition and/or the one or more DAP and/or the one or more DAPS may produce at least about 20%, at least about 25%, about 30%, about 35%, about 40%, or about 50%, by weight, of bed solids.

In one embodiment, processes using the composition and/or the one or more DAP and/or the one or more DAPS may produce less than about 3 wt %, about 2.5 wt %, about 2 wt %, about 1.5 wt %, about 1 wt %, about 0.5 wt %, or about 0.3 wt % solids in the supernatant.

In some embodiments the one or more DAP and/or one or more DAPS, may have a solution viscosity in process water which is less than 90% of the viscosity of a similar polymer synthesized above pH 6.5. In exemplary embodiments, the one or more DAP and/or one or more DAPS, may be characterized by one or more of the following: they may possess better dewaterability, they may be easier to mix into the tailings, they may have less of a tendency to hold water, and/or they may have an increased ability to flocculate fine solids, e.g., FFT and/or MFT, as compared to other flocculants known in the art.

In exemplary embodiments, the molecular weight of the one or more DAP and/or one or more DAPS may have a molecular weight that provides for efficient processing of the tailings that are to be processed, for example, processing tailings that may include sand, tailings that may include MFT, or tailings that may contain any mixture of particle sizes.

In exemplary embodiments, the one or more DAP and/or one or more DAPS, may ease makedown. In an exemplary embodiment, said one or more DAP and/or one or more DAPS may be made at a higher solution concentration in order to obtain a similar viscosity as a standard polymer made at a lower solution concentration. Preparing an example of said one or more polymers at higher solution concentration may require reduced volumes of water for makedown of a mother solution, without concern of high viscosities creating mixing 'dead zones' in aging or maturation tanks.

In exemplary embodiments, the one or more DAP and/or one or more DAPS, generally comprise a lower viscosity as compared to standard acrylamide/acrylate DPAM. An exemplary embodiment generally comprises a solution comprising one or more DAP and/or one or more DAPS, wherein said solution comprises a viscosity in process water which may be less than 90% of the viscosity of a similar polymer synthesized above pH 6.5.

In relation to the discussions of viscosity above and below, viscosity may be measured using a rotational viscometer equipped with a single gap concentric cylinder.

In exemplary embodiments, the use of the composition and/or the one or more DAP and/or one or more DAPS, may confer many advantages as compared to other general methods of tailings treatment, e.g., oil sands tailings treatment. In exemplary embodiments, the composition and/or the one or more DAP and/or one or more DAPS, generally comprise a lower viscosity as compared to standard acrylamide/acrylate DPAM, and said lower viscosity generally may confer a number of advantages as compared to the use of standard acrylamide/acrylate DPAM for tailings treatment, e.g., oil sands tailings treatment, such as but not limited to those advantages described below:

1) The use of said DAP or DAPS polymers may improve dissolution. Said polymers may have desired polymer MWs tuned such as to meet tailings dewatering needs while also having lower solution viscosities. These properties generally may provide an ease of polymer makedown.
2) The use of said DAP or DAPS polymers may allow for higher active concentrations to be achieved. The lower solution viscosities of said polymers may also allow for a higher concentration of polymer solution to be obtained, thereby reducing demand of makedown water.
3) The use of said DAP or DAPS polymers may allow for improved mixing for application of polymer to the slurry and/or tailings. The lower polymer solution viscosities of DAP and/or DAPS may reduce the mixing induction time of the slurry and/or tailings (such as MFT) and polymer solutions.
4) The use of said DAP or DAPS polymers may allow for higher molecular weight polymers to be utilized. Higher MW polymers, such as DAP and/or DAPS, may potentially eliminate detrimentally high solution viscosities.
5) The use of said DAP or DAPS polymers may allow lower molecular weight polymers to be utilized. Polymerization at lower pH values, as may be used to generate the one or more polymers discussed herein, e.g., DPAM polymers and/or DAP and/or DAPS, tend to generate lower molecular weight polymers that may be utilized.
6) The use of said DAP or DAPS polymers may simplify manufacturing and/or may improve throughput. In an embodiment, when manufacturing DAP, addition of NaOH (to form sodium acrylate from acrylic acid) may be eliminated. The heat of neutralization may not be generated and a cool down period prior to polymerization may not be needed.
7) The use of said DAP or DAPS polymers may allow for a higher active product. In an embodiment, a DAP polymer without salt may not contain inactive salt or heavy inactive counter ions (such as sodium). This condition may enable higher possible concentration of active product (organic polymer).

8) The use of said DAP or DAPS polymers may allow for improved control over polymer solution viscosities. Solution viscosity may be adjusted to desired levels by changing the pH of polymerization when generating said polymers.

In exemplary embodiments, a composition comprising and/or method comprising use of and/or a process comprising use of one or more DAP and/or one or more DAPS may comprise one or more DAP and/or one or more DAPS that comprise at least one anionic monomer that is neutral at low pH (group 2 monomer), and has a molar ratio of group 2 monomer acid to group 2 monomer salt that is greater or equal to about 0.02. In exemplary embodiments, said group 2 monomer may comprise the acid and salt form of acrylic acid, acrylic acid and acrylate salt, respectively, and/or methacrylic acid, methacrylic acid and methacrylate salt, respectively. In exemplary embodiments, one or more DAP and one or more DAPs, and/or a composition comprising and/or processes comprising the use of and/or methods comprising the use of, comprise acrylic acid and/or methacrylic acid. In exemplary embodiments said one or more DAP and one or more DAPs may comprise acrylic acid, and the molar ratio of acrylic acid (AA) to acrylate salt (A⁻) may be equal to or greater than 0.02. In exemplary embodiments said one or more DAP and one or more DAPs may comprise methacrylic acid, and the molar ratio of methacrylic acid (MAA) to methacrylate salt (MA⁻) may be equal to or greater than 0.05. In exemplary embodiments, the desired molar ratio of the acrylic acid or methacrylic acid and its corresponding salt may be calculated by using the Henderson-Hasselbalch equation:

$$pH = pK_a + \text{Log}\frac{[Base]}{[Acid]}$$

ot $$pH = pK_a - \text{Log}\frac{[Acid]}{[base]}$$

Using the Henderson-Hasselbalch equation and the $pK_a$ constant values for acrylic acid (4.25) and methacrylic acid (4.65), the targeted molar ratio may be obtained at the calculated pH, an example of which for each acrylic acid and methacrylic acid, respectively, follows:

$$pH = pK_a - \text{Log}\frac{[AA]}{[A-]}$$

pH=(4.25)−log(0.02)

pH=5.95 or lower for acrylic acid;

$$pH = pK_a - \text{Log}\frac{[MAA]}{[MA-]}$$

pH=(4.65)−log(0.05)

pH=5.95 or lower for methacrylic acid.

Furthermore, the Henderson-Hasselbalch equation may be used to calculate the molar ratio of group 2 monomer acid, e.g., acrylic or methacrylic acid, to group 2 monomer salt, e.g., the salt form of acrylic or methacrylic acid, at a variety of pH values. For example, see Table 1 (below) for example calculations using the acid and salt forms of acrylic acid (using $pK_a$ value of 4.25) and methacrylic acid (using $pK_a$ value of 4.65):

TABLE 1

| Monomer | pH 6.0 | pH 5.5 | pH 5.0 | pH 4.5 | pH 5.0 | pH 3.5 | pH 3.0 | pH 2.5 | pH 2.0 |
|---|---|---|---|---|---|---|---|---|---|
| | | | | Molar Ratio Acid Form to Salt Form | | | | | |
| AA | 0.02 | 0.06 | 0.18 | 0.56 | 1.78 | 5.62 | 17.78 | 56.23 | 177.83 |
| MAA | 0.04 | 0.14 | 0.45 | 1.41 | 4.47 | 14.13 | 44.67 | 141.25 | 446.68 |

Additionally, the present disclosure generally relates to a method of synthesizing a DAP or DAPS, wherein said method comprises: a. providing a monomer mixture comprising one or more anionic monomers that are neutral at low pH (group 2 monomers); b. polymerizing the monomer mixture to produce a polymer gel, wherein the polymerization is initiated at a pH of 6.0 or less, or adjusted to a pH of 6.0 or less prior to completion of the polymerization; and c. drying the polymer gel to produce a DAP or DAPS. Furthermore, the instant disclosure generally encompasses a composition comprising one or more DAP and/or one or more DAPS, wherein the one or more DAP and/or one or more DAPS comprises at least one anionic monomer that is neutral at low pH and wherein polymerization of the one or more DAP and/or one or more DAPS is initiated at a pH value of about 6.0 or less, or the pH value is adjusted to about 6.0 or less prior to completion of polymerization. Moreover, the present disclosure also generally pertains to a process of treating tailings which comprise water and solids, the process comprising: a. adding to the tailings one or more DAP and/or one or more DAPS that comprises at least one anionic monomer that is neutral at low pH (group 2 monomer), and has a ratio of group 2 monomer acid to group 2 monomer salt that is greater or equal to about 0.02; b. allowing at least a portion of the solids to flocculate; and c. separating at least a portion of the flocculated solids from the tailings.

The following examples are presented for illustrative purposes only and are not intended to be limiting.

EXAMPLES

Polymer Preparation

Polymerization: Aqueous solutions of Vazo 50 (V50) (25 g, 3.52% by wt.), ferrous ammonium sulfate (FAS) (100 g, 0.140% by wt.), and ammonium persulfate (APS) (100 g, 0.175% by wt.) in Erlenmeyer flasks and a monomer mixture (described below) (350 g) in an insulated dewar were deoxygenated by sparging with nitrogen gas for 1 h. V50 (1.00 mL), APS (1.00 mL), and FAS (1.00 mL) were added with swirling after each addition. After a temperature increase of 2° C., sparging was stopped, and the dewar was sealed. Polymerization was monitored by monitoring temperature.

Monomer Solution for dry acrylamide-sodium acrylate copolymer with initiation pH >6: NaOH (46.4 g, 50% by wt., 0.580 mol), deionized water (46 g), and a Teflon coated magnetic stir bar were added to a jacketed beaker with stirring. The beaker was cooled with flowing water cooled to 10° C. by a chiller. A solution of glacial acrylic acid (41.8 g, 0.580 mol, 35.0% by moles of monomer) in deionized water (42 g) was added with stirring at a rate not to exceed a temperature above 35° C. After complete addition, the mixture temperature was brought to 25° C. before disconnecting the chiller. The pH was adjusted with NaOH (50% by wt.) to maintain a pH of 11 for 30 min, then adjusted with sulfuric acid (25% by wt.) to a pH of 7.5-8. Deionized water (40.1 g), diethylenetriaminepentaacetic acid (DPTA) (0.0876 g, 40% by wt.), and the sodium acrylate mixture were added to a jacketed beaker charged with catalytic acrylamide (153.2 g, 50% by wt., 1.08 mol, 65.0% by moles of monomer, pre-chilled for 30 min). Sodium hypophosphite (1.0 mL, 1% by wt. in deionized water, 0.01 g, 0.114 mmol) was added and pH was adjusted with sulfuric acid (25% by wt.) to a pH of 6.9 with stirring. The monomer mixture was then cooled to 0° C.

Monomer Solution for dry acrylamide-sodium acrylate copolymer with initiation pH<6: NaOH (27.8 g, 50% by wt., 0.347 mol), deionized water (28 g), and a Teflon coated magnetic stir bar was added to a jacketed beaker with stirring. The beaker was cooled with flowing water from a chiller set at 10° C. A solution of glacial acrylic acid (25.7 g, 0.356 mol, 26.6% by moles of monomer) in deionized water (26 g) was added with stirring at a rate not to exceed a temperature above 35° C. After complete addition, the mixture temperature was brought to 25° C. before disconnecting the chiller. Deionized water (63.3 g) and the sodium acrylate mixture were added to a jacketed beaker charged with bio acrylamide (186.7 g, 38% by wt., 0.985 mol, 73.4% by moles of monomer, pre-chilled for 30 min). The solution pH was adjusted with sulfuric acid (25% by wt.) to a pH of 5.9 with stirring. The monomer mixture was cooled to 10° C.

Monomer Solution for dry acrylamide-acrylic acid copolymer: Glacial acrylic acid (39.2 g, 0.544 mol, 35.0% by moles of monomer), catalytic acrylamide (143.6 g, 50% wt., 1.01 mol, pre-chilled for 30 min), deionized water (186.3 g), and DPTA (0.0876 g, 40% by wt.) were added with stirring (magnetic) to a jacketed beaker cooled with flowing water from a chiller set at 0° C. Sodium hypophosphite (1.0 mL, 1% by wt. in deionized water, 0.01 g, 0.114 mmol) was added and monomer solution was then cooled to 0° C.

Monomer Solution for dry acrylamide-acrylic acid copolymer with sodium sulfate: Glacial acrylic acid (39.2 g, 0.544 mol, 35.0% by moles of monomer), catalytic acrylamide (143.6 g, 50% by wt., 1.01 mol, pre-chilled for 30 min), deionized water (186.3 g), and DPTA (0.0876 g, 40% by wt.) were added with stirring (magnetic) to a jacketed beaker cooled with flowing water from a chiller set at 0° C. Sodium hypophosphite (1.0 mL, 1% by wt. in deionized water, 0.01 g, 0.114 mmol) was added. Anhydrous sodium sulfate (38.6 g, 0.272 mol) was added gradually with stirring and the monomer solution was then cooled to 0° C.

Example 1: Viscosity Reduction of Polymer Solutions

In the following example, exemplary DAPs polymerized with an initiation pH<6 were compared with conventional DPAMs polymerized with an initiation pH >6. These DAPs and DPAMs were made as solutions in oil sands process-affected water ("OSPW") and the viscosity was measured as a function of shear rate.

The effect of polymerization initiation pH on solution viscosity was evaluated for dry copolymers which comprised acrylamide/calcium diacrylate. Polymerization initiation pH values of 6.9, 5.9, and 4.9 were evaluated. The polymer solutions at the three different pH values were dissolved at 0.4% by weight in OSPW. The results presented in FIG. 1 demonstrated that the solution viscosity reduced as the initiation pH was lowered below 6.

Figure 2:
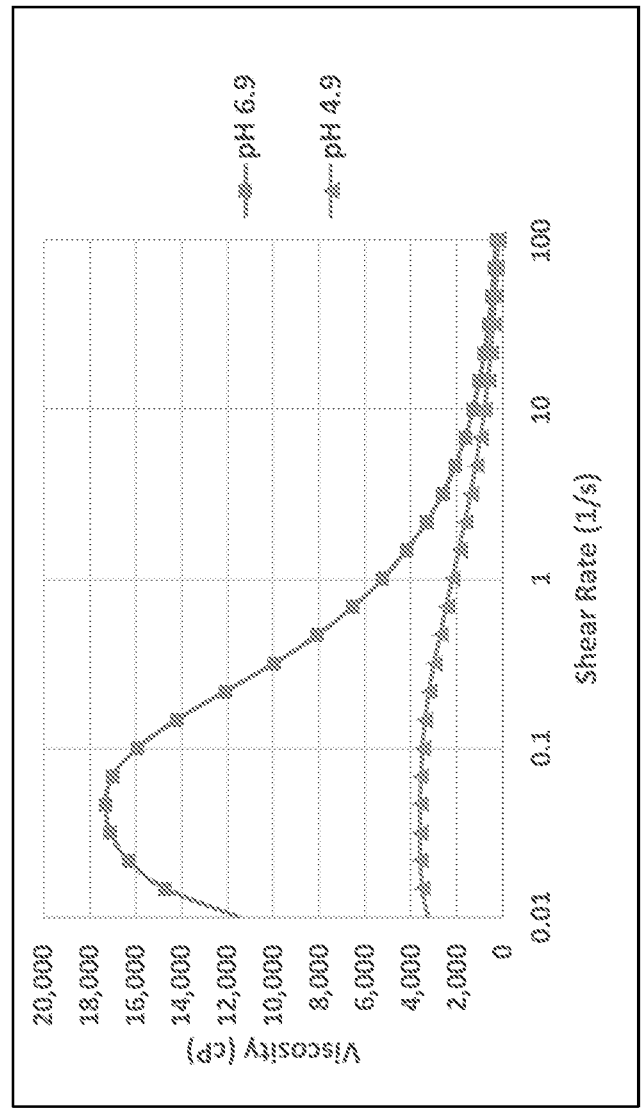
FIG. 2 presents data related to an experiment that evaluated viscosity vs. shear rate for dry copolymers which comprised acrylamide/sodium acrylate at two different polymerization initiation pH values (6.9 and 4.9). Solutions were made at 1.2% by weight in OSPW.

The effect of initiation pH on solution viscosity was evaluated for dry copolymers which comprised acrylamide/sodium acrylate. Polymerization initiation pH values of 6.9 and 4.9 were evaluated. The polymer were dissolved at 1.2% by weight in OSPW. The results presented in FIG. 2 demonstrated that the solution viscosity reduced as the initiation pH was lowered below 6.

Example 2: Comparison of Settling Performance

In the following example, mature fine tailings (MFT, 32% solids) were flocculated with commercial products (Polymer A, Polymer B, and Polymer C) and an exemplary embodiment (DAPS). For the experiment, 1 kg of MFT was mixed with 650 g/t of polymer using an overhead stirrer. The treated MFT was then transferred to a graduated cylinder, and the settling was monitored over time period of 28 days.

Figure 3:
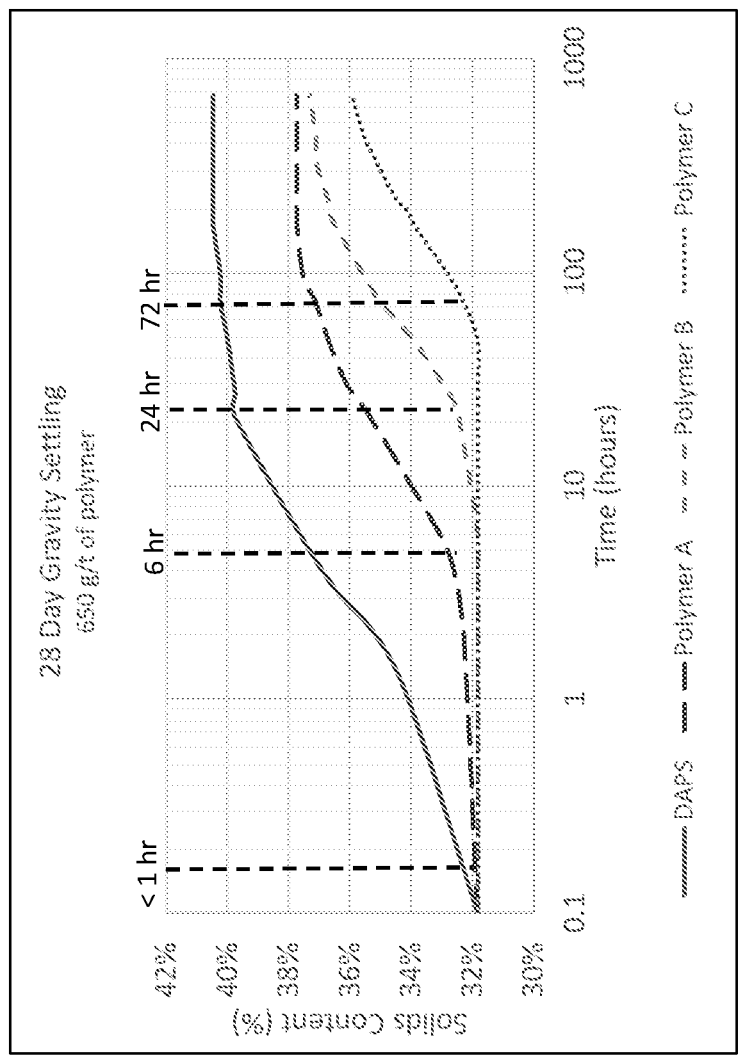
FIG. 3 presents data related to an experiment that compared the settling performance of four different polymers: an exemplary embodiment (DAPS); and three different commercial products: Polymer A, Polymer B, and Polymer C. For the experiment, 1 kg of MFT was mixed with 650 g/t of polymer. The treated MFT was transferred to a graduated cylinder and the settling was monitored over a time period of 28 days.

The results presented in FIG. 3 demonstrated that the exemplary polymer (DAPS) had a faster initial settling rate, which ultimately led to a higher solids content of the settled bed.

In the preceding procedures, various steps have been described. It will, however, be evident that various modifications and changes may be made thereto, and additional procedures may be implemented, without departing from the broader scope of the exemplary procedures as set forth in the claims that follow.

The invention claimed is:

1. A tailings composition comprising oil sands tailings, to which is added an effective amount of a flocculant consisting of one or more dry acid polymers ("DAP") or one or more dry acid polymer with salts ("DAPS") that comprise at least one anionic monomer that is neutral at low pH (group 2 monomer), and having a ratio of group 2 monomer acid to group 2 monomer salt that is greater than 0.02 and less than 1.0 at a pH of from 5.9 or less when calculated using the Henderson-Hasselbalch equation.

2. The tailings composition of claim 1, wherein at least a portion of the solids in the tailings composition is permitted to flocculate after addition of the flocculant.

3. The tailings composition of claim 1, wherein polymerization of the one or more DAP and/or one or more DAPS is initiated at a pH value of about 5.9 or less, and/or the pH is adjusted to a value of about 5.9 or less during and/or after completion of polymerization.

4. The tailings composition of claim 1, wherein:
   (i) the at least one group 2 monomer comprises acrylic acid monomer, and the one or more DAP and/or one or more DAPS has a ratio of acrylic acid to acrylate salt that is greater than 0.02;
   (ii) the at least one group 2 monomer comprises methacrylic acid monomer, and the one or more DAP and/or one or more DAPS has a ratio of methacrylic acid to methacrylate salt that is greater or equal to about 0.05;

(iii) said one or more DAP and/or one or more DAPS comprise acrylamide monomers and acrylic acid monomers;
(iv) said one or more DAPS comprise acrylamide and acrylate salts with up to stoichiometric amounts of acid;
(v) said one or more DAPS are produced by polymerizing acrylamide and acrylic acid in the presence of one or more salts;
(vi) said one or more DAPS comprise acrylamide and acrylate salts with up to stoichiometric amounts of sulfuric acid;
(vii) said one or more anionic monomers that are neutral at low pH (group 2 monomers) are selected from acrylic acid, methacrylic acid, maleic acid monomers, any monomer substituted with a carboxylic acid group, or salt of any of the foregoing, and combinations thereof; and/or
(viii) said one or more DAP and/or one or more DAPS further comprises one or more monomers selected from:
  a. nonionic monomers (group 1 monomers); and/or
  b. anionic monomers that are anionic at low pH (group 3 monomers); and/or
  c. cationic monomers (group 4 monomers).

5. The tailings composition of claim 4, embodiment (viii), wherein:
(i) said one or more nonionic monomers (group 1 monomers) are selected from: acrylamide, methacrylamide, vinyl, allyl, and ethyl monomers, N-vinylpyridine, N-vinylimidazole, isopropylacrylamide, isopropylmethacrylamide, polyethylene glycol methacrylate, and combinations thereof;
(ii) any of said one or more nonionic monomers (group 1 monomers) are substituted with a side chain selected from: an alkyl, arylalkyl, dialkyl, ethoxyl, and/or hydrophobic group;
(iii) said one or more anionic monomers that are anionic at low pH (group 3 monomers) are selected from: sulfonic acids or a sulfonic acid group, 2-acrylamido-2-methylpropane sulfonic acid ("ATBS"), and combinations thereof; and/or
(iv) said one or more cationic monomers (group 4 monomers) is selected from:
acryloyloxyethyltrimethylammonium chloride; methacryloyloxyethyltrimethylammonium chloride, methacrylamidopropyltrimethylammonium chloride, acrylamidopropylammonium chloride, methacryloyloxyethyldimethylammonium sulfate, dimethylaminoethyl acrylate, dimethylaminopropylmethacrylamide, diallyldimethylammonium chloride, and combinations thereof.

6. The tailings composition of claim 1, wherein:
(i) said one or more DAP and/or one or more DAPS has a weight average molecular weight above 1,000,000 Da;
(ii) said one or more DAP and/or one or more DAPS comprise from about 5 to about 100 mol % of the at least one anionic monomers that are neutral at low pH (group 2 monomers);
(iii) said one or more DAP and/or one or more DAPS comprises from about 20 mol % to about 45 mol % of the at least one anionic monomers that are neutral at low pH (group 2 monomers);
(iv) said one or more DAP and/or one or more DAPS are added to tailings to provide between about 50 and about 2000 grams per dry ton of solid tailings (g/t);
(v) said one or more DAP and/or one or more DAPS are added to oil sands process-affected water to provide about 0.01-2% by weight of polymer in the process affected water;
(vi) said one or more DAP and/or one or more DAPS are applied to a dilute tailings suspension to provide a solution concentration of about 0.01 to 0.05%;
(vii) said one or more DAP and/or one or more DAPS are applied to the concentrated tailings suspension to provide a concentration of about 0.4% to about 1.0%; and/or
(viii) separation of solids from tailings is by centrifuge, hydrocyclone, decantation, filtration, thickening or another mechanical separation.

7. The tailings composition of claim 1, wherein: polymerization of the one or more DAP and/or one or more DAPS is initiated at a pH value of 5.9 or less.

8. The tailings composition of claim 1, wherein: during or after polymerization of the one or more DAP and/or one or more DAPS the pH is adjusted to a value of 5.9 or less prior to and/or after completion of polymerization.

9. The tailings composition of claim 1, wherein: polymerization of the one or more DAP and/or one or more DAPS is initiated at a pH value of 4.9 or less, or is adjusted to a pH value of 4.9 or less prior to completion of polymerization.

10. The tailings composition of claim 1, wherein: polymerization of the one or more DAP and/or one or more DAPS is initiated at a pH value of 4.9 or less.

11. The tailings composition of claim 1, wherein: during polymerization of the one or more DAP and/or one or more DAPS the pH is adjusted to a value of 4.9 or less prior to completion of polymerization.

* * * * *